United States Patent
Sherman et al.

(10) Patent No.: US 8,630,928 B1
(45) Date of Patent: Jan. 14, 2014

(54) ASSET-BACKED CONVERTIBLE SECURITY

(75) Inventors: Michael E. Sherman, Brooklyn, NY (US); Basil Williams, New York, NY (US); Diane Rinnovatore, Edison, NJ (US); Kent Peer-Nous, New York, NY (US); Henry Domenici, New York, NY (US)

(73) Assignee: Barclays Capital Inc., New York, NY (US)

( * ) Notice: Subject to any disclaimer, the term of this patent is extended or adjusted under 35 U.S.C. 154(b) by 2559 days.

(21) Appl. No.: 10/750,192

(22) Filed: Dec. 31, 2003

Related U.S. Application Data

(63) Continuation of application No. 10/322,085, filed on Dec. 23, 2002, now abandoned.

(51) Int. Cl.
  *G06Q 40/00* (2012.01)
  *G06Q 40/04* (2012.01)
  *G06Q 40/06* (2012.01)

(52) U.S. Cl.
  CPC ............... *G06Q 40/00* (2013.01); *G06Q 40/06* (2013.01); *G06Q 40/04* (2013.01)
  USPC .............................. 705/35; 705/36 R; 705/37

(58) Field of Classification Search
  CPC ........ G06Q 40/00; G06Q 40/04; G06Q 40/06
  USPC .............................. 705/1, 35, 36, 36 R, 38, 37
  See application file for complete search history.

(56) References Cited

U.S. PATENT DOCUMENTS

| | | | |
|---|---|---|---|
| 5,870,720 A * | 2/1999 | Chusid et al. | 705/38 |
| 6,618,707 B1 * | 9/2003 | Gary | 705/36 R |
| 7,024,384 B2 * | 4/2006 | Daughtery, III | 705/36 R |
| 7,206,755 B1 * | 4/2007 | Muralidhar | 705/26 |
| 7,212,997 B1 * | 5/2007 | Pine et al | 705/36 R |
| 7,222,094 B2 * | 5/2007 | Ross | 705/36 R |
| 7,246,093 B1 * | 7/2007 | Katz | 705/37 |
| 7,315,838 B2 * | 1/2008 | Gershon | 705/36 R |
| 7,415,436 B1 * | 8/2008 | Evelyn et al. | 705/37 |
| 7,574,396 B2 * | 8/2009 | Kalotay et al. | 705/37 |
| 2002/0035530 A1 * | 3/2002 | Ervolini et al. | 705/36 |
| 2002/0147670 A1 * | 10/2002 | Lange | 705/35 |
| 2002/0156709 A1 * | 10/2002 | Andrus et al. | 705/35 |
| 2003/0120568 A1 * | 6/2003 | Chacko et al. | 705/35 |
| 2005/0086148 A1 * | 4/2005 | Woodruff et al. | 705/36 |

FOREIGN PATENT DOCUMENTS

| | | | | |
|---|---|---|---|---|
| CA | 2426491 A1 * | 5/2002 | | G06F 17/60 |
| WO | WO 0133396 A2 * | 5/2001 | | G06F 17/00 |

OTHER PUBLICATIONS

Deloitte & Touche; "Heads Up: Accounting, Tax and Regulatory Developments Affecting Capital Markets Instruments and Strategies: The ABCs of ABS: Accounting for Asset-Backed Securities"; Jul. 28, 2000; vol. 7; Issue 8; pp. 1-7.*
http://en.wikipedia.org/wiki/Asset-Bbacked_security; Asset-backed security-Wikipedia, the free encyclopedia; pp. 1-7; date unknown.*
The Investment Dealers' Digest; IDD, New York; "Debt Propels Record 2001: 2002 looks better for equities, high-yield, ABS but not high-grade debt"; Jan. 7, 2002; pp. 1-6.*
Asset-Backed Alert; "Canada Allows Convertible ABS"; Mar. 27, 2000; p. 2.*

* cited by examiner

*Primary Examiner* — Ella Colbert
(74) *Attorney, Agent, or Firm* — Morgan Lewis & Bockius LLP

(57) ABSTRACT

There is provided a financial unit security. The financial unit security includes a secured debt security and an option. The secured debt security and the option are coupled together as a unit.

11 Claims, 4 Drawing Sheets

ASSET-BACKED CONVERTIBLE SECURITY

This application is a continuation of application Ser. No. 10/322,085, filed Dec. 23, 2002 now abandoned.

BACKGROUND OF THE INVENTION

1. Field of the Invention

The present invention relates to financial securities, and more particularly, to a financial unit security having a debt component and an option component.

2. Description of the Related Art

A financial unit security is a combination of two or more individual securities that are coupled together and issued as a single unit. One example of a financial unit security is a combination of a debt instrument and an option instrument into a single structure.

A traditional convertible bond is a single debt instrument, i.e., non-unit. A holder of a convertible bond may have a right to receive interest until the maturity of the bond or an earlier redemption event, and has a right to receive the stated principal amount of the bond at maturity. Also, the holder may choose to convert the bond into shares of common stock or other specified equity interests of a corporate entity at a predetermined ratio at anytime. The ratio or "conversion ratio" is determined at the date of issue of the convertible bond by dividing the issue price of the bond by a conversion price determined by the issuer of the convertible bond at the time of issue. This ratio usually does not change during the life of the security absent so-called anti-dilution adjustments.

A secured debt security, e.g., an asset-backed security (ABS), is a security in which payment rights are secured by a pledge of specified assets of the issuer of the security. Each investor in the security has a secured claim against these pledged assets.

Issuers in the secured debt markets may not find sufficient buyers for their secured debt. The present inventors recognize an opportunity for these issuers to issue their secured debt by providing a product to sell to an alternative market, the unit investor.

SUMMARY OF THE INVENTION

The present invention provides for a financial unit security. The financial unit security includes a secured debt security and an option. The secured debt security and the option are coupled together as a unit.

The secured debt security may entitle a holder of the financial unit security to receive interest payments and will entitle the holder of the financial unit security to receipt of the payment of the secured debt security's stated principal amount at maturity, which payments are secured by an asset or assets of the issuer of the secured debt security.

The option entitles the holder of the financial unit security to buy some other security or some other asset at a specified price by a set time. For example, the option may be a warrant that entitles the holder of the financial unit security to purchase shares of common stock, or other specified equity interest, of the issuer of the warrant.

The financial unit security is valued based on a number of factors, which may include: (1) volatility of the asset that is the subject of the option; (2) yield for a comparable secured debt security; (3) interest rates in a debt market at a time of issuance of the financial unit security; (4) stated maturity date of the financial unit security; (5) price at which the option may be exercised; and (6) interest paid on the secured debt security that is part of the financial unit security.

DESCRIPTION OF THE INVENTION

Figure 1:
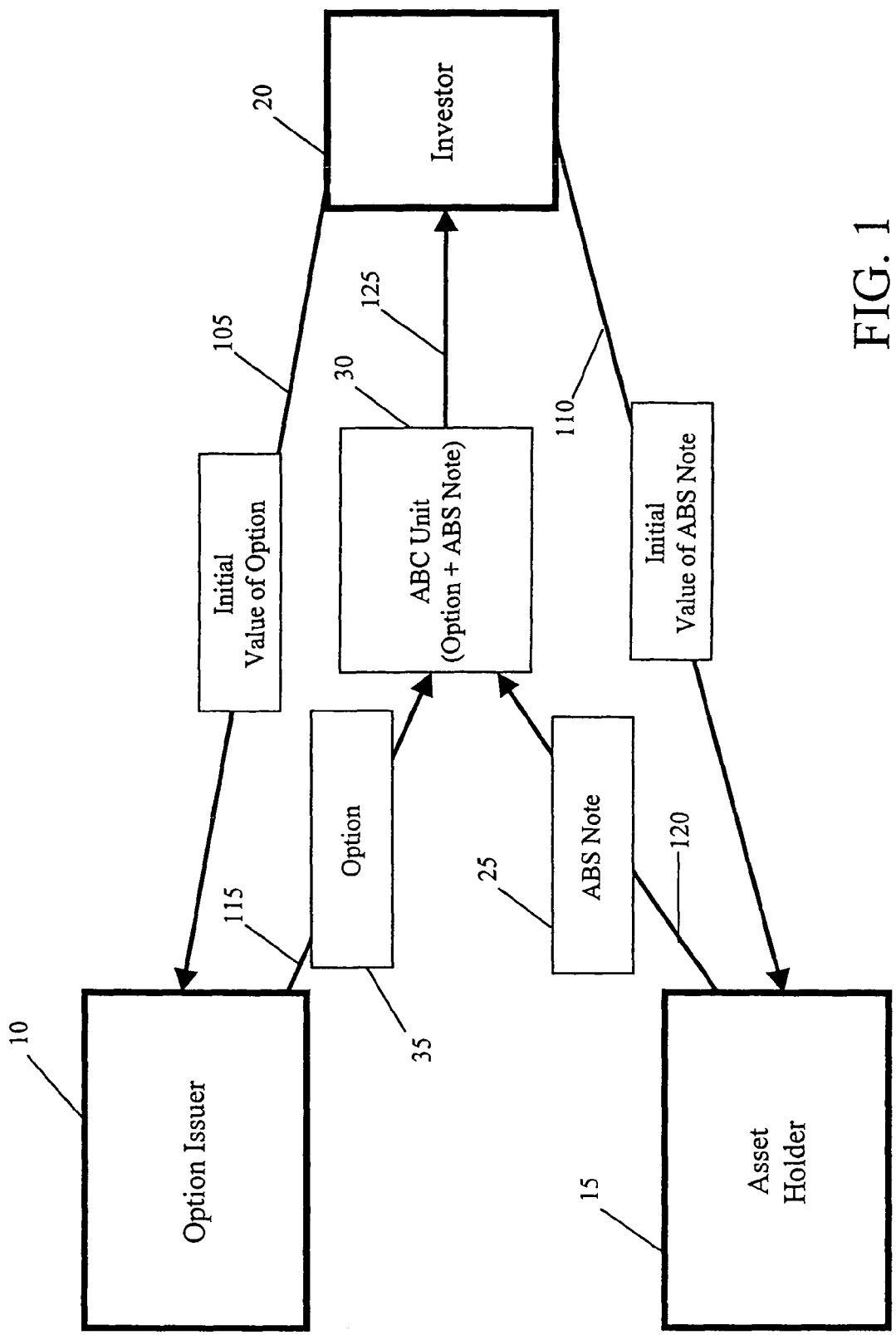
FIG. 1 is a cash flow schematic diagram of activity during issuance of a financial unit security in accordance with the present invention.

The present invention provides for a financial unit security having a secured debt component and an option component. The financial unit security is also referred to herein as an asset-backed convertible (ABC) unit. One or more certificates evidencing the secured debt are issued to the issuer of the unit by the issuer of the secured debt security. These secured debt certificates are issued against payment by the unit issuer to the secured debt issuer. One or more certificates evidencing the option are issued to the unit issuer by the option issuer. These option certificates are issued against payment by the unit issuer to the option issuer. The unit issuer issues one or more certificates representing the unit securities. These certificates are deposited with a depositary such as The Depository Trust Company ("DTC") or its agent. DTC acts as securities depositary for the financial unit securities, each of which is registered for credit to an account of a direct or indirect participant in DTC. These direct and indirect participants in DTC are, or act as agents for, the investors in the unit securities.

One example of the ABC unit comprises a secured note and a warrant. The note may entitle the holder of the ABC unit to a payment at a stated yield and will entitle the holder to receipt of the note's stated principal amount at a maturity date. The warrant entitles the holder of the ABC unit to buy some other security, e.g., common stock, or some other asset at a specified price by a set time.

In the ABC unit, the note and the option represent rights and obligations that are generally independent of each other. However, in the ABC unit, these rights and obligations can overlap. The ABC unit can be issued by an issuer of either the secured debt security or the option, or by a third party.

Because the note component of the ABC unit is a secured obligation, the holder, i.e., investor, of the ABC unit has a right to a payment with respect to the note, which obligation is secured by a pledge of specified assets of the issuer of the note. Each investor in the ABC unit has a secured claim against these pledged assets. Depending upon the specific terms of the ABC unit, the investor may or may not also have a claim, with respect to the note, against the issuer of the ABC unit, or the ABC option, directly, independent of the pledged assets. In a conventional unsecured convertible note instrument, investors only have a claim against the issuer of the convertible note, and no secured claim against any pledged assets exists. The effect of the corporate debt risk of the issuer of the note, which is inherent in unsecured convertible debt, is significantly reduced or eliminated with the ABC unit.

The option component of the ABC unit entitles its holder to buy some other security or some other asset at a specified price by a set time. An example is a warrant entitling the holder of the ABC unit to purchase shares of common stock, or other equity interest, of the issuer of the warrant at a specified exercise price at any time before a specified expiration date. Investors exercise options when the exercise price of the option for the assets is lower than the price of the assets on the open market. If the exercise price of the option for the assets is not less than the price of the assets on the open market at the maturity of the option, the option will expire worthless.

The ABC unit structure need not be used exclusively to monetize assets that are routinely issued in the secured debt market. Any secured debt security can be included in this structure, and the ABC unit can also incorporate securities that either are or are not rated by a securities ratings agency. The ABC unit broadens demand for secured debt beyond traditional investors in secured debt securities by providing an option component. Therefore, the ABC unit structure has application to secured debt that is not otherwise sold to traditional investors in secured debt securities.

The ABC unit is valued according to a number of factors. For example, if the option were a warrant to purchase equity in company XYZ and the note were secured by assets in the same company, the following factors would be considered in a determination of a specific value of the ABC unit; (1) volatility of common stock of XYZ; (2) yield for a comparable secured debt security; (3) interest rates in the debt market at the time of issuance of the ABC unit; (4) stated maturity date of the ABC unit; (5) price at which the option may be exercised; and (6) interest paid on the note that is part of the unit.

FIGS. 1-4 are cash flow schematics of various activities relating to management of an ABC unit 30 in accordance with the present invention. ABC unit 30 is a financial unit security having a secured debt component (ABS note 25) and an option component (option 35). ABS note 25 is a secured debt security. Option 35 is an option entitling the holder of ABC unit 30 to purchase an asset at a specified price by a set time.

Several entities are involved, namely an investor 20, an asset holder 15, and an option issuer 10. Investor 20 is an investor in ABC unit 30. Asset holder 15 is the holder of assets that secure the obligations of ABS note 25. Option issuer 10 is an issuer of option 35. For example, asset holder 15 and option issuer 10 might be public corporations listed on the New York Stock Exchange or quoted on the NASDAQ national market.

The activities relating to management of ABC unit 30 are described herein as steps and are represented by vectors directed from one entity to another. For purpose of explanation, the steps are described in a particular sequence, but in practice the actual sequence may vary depending on local customs or on agreements between option issuer 10, asset holder 15 and investor 20. Note also that FIGS. 1-4 do not represent an exclusive manner by which the ABC unit can be managed. Other parties, for example a transfer agent (not shown), a unit issuer (not shown) and a paying agent (not shown), and other steps, can be involved in the management of the ABC unit.

FIG. 1 is a cash flow schematic diagram of activity during issuance of ABC unit 30. In step 105, investor 20 delivers a payment for option 35 to option issuer 10. This payment is for the initial value of option 35. In step 110, investor 20 delivers a payment for ABS note 25 to asset holder 15. This payment is for the initial value of ABS note 25. In step 115, option issuer 10 issues option 35 for contribution to ABC unit 30. In step 120, asset holder 15 issues ABS note 25 for contribution to ABC unit 30. In step 125, and ABS unit 30 is delivered to investor 20.

ABC unit 30 is constructed by coupling ABS note 25 to option 35 together as a unit. In one embodiment of ABC unit 30, option 35 and ABS note 25 are attached to one another. In another embodiment, ABC unit 30 is a stand-alone certificate that represents, or has provisions for, underlying obligations of ABS note 25 and option 35.

Figure 2:
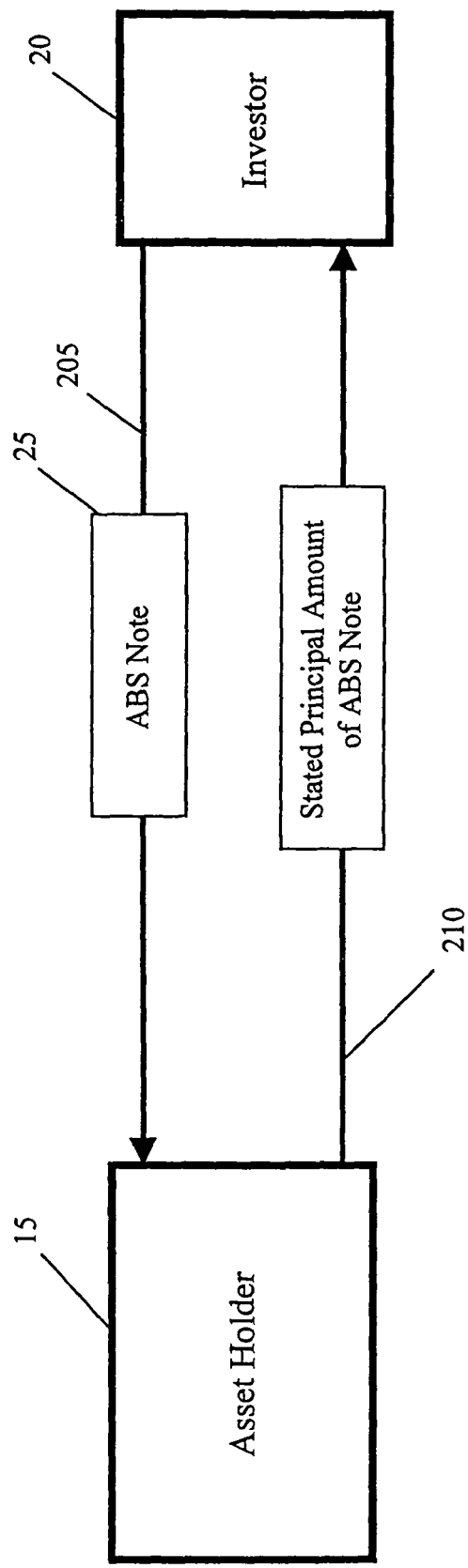
FIG. 2 is a cash flow schematic diagram of activity at maturity of the financial unit security shown in FIG. 1, in a case of the financial unit security being "out-of-the-money".

FIG. 2 is a cash flow schematic diagram of activity at maturity of ABC unit 30, in a case of ABC unit 30 being "out-of-the-money". That is, option 35 has matured and expired worthless. In step 205, investor 20 delivers ABS note 25 to asset holder 15. ABS note 25 is retired. In step 210, asset holder 15 delivers the stated principal amount of ABS note 25 to investor 20.

Figure 3:
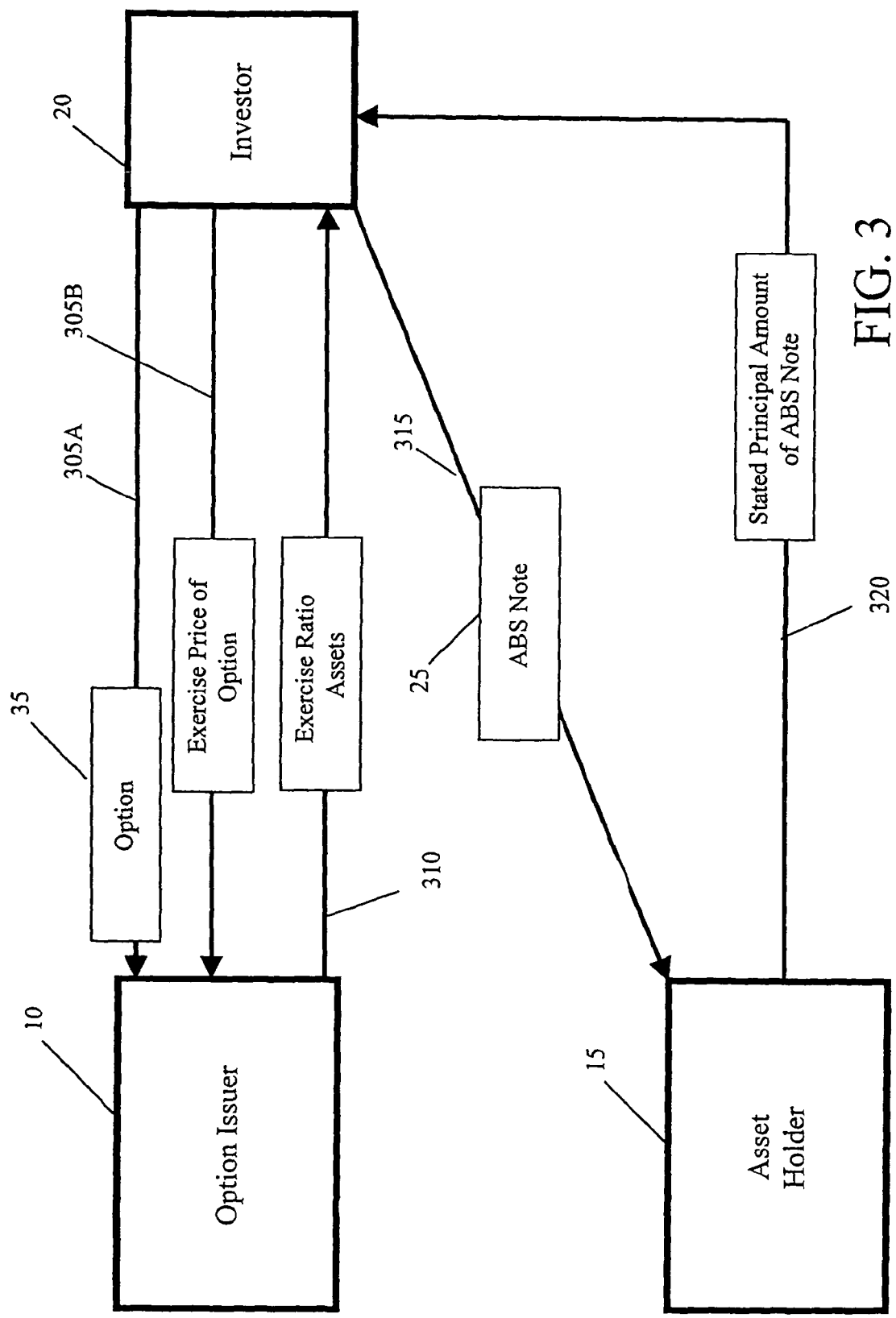
FIG. 3 is a cash flow schematic diagram of a physical cash settlement at maturity of the financial unit security shown in FIG. 1, in a case of the financial unit security being "in-the-money".

FIG. 3 is a cash flow schematic diagram of a physical settlement at maturity of ABC unit 30, in a case of ABC unit 30 being "in-the-money". That is, ABS note 25 has matured, and option 35 is in-the-money, and hence, option 35 has value. In physical settlement, investor 20 pays the exercise price of option 35 to option issuer 10 and, in return, receives exercise ratio assets. "Exercise ratio assets" refers to the amount of assets deliverable to investor 20 as determined at issuance by dividing the issue price of the ABC unit by the exercise price of the option.

In step 305A, investor 20 delivers option 35 to option issuer 10. Additionally, in step 305B, investor 20 delivers the exercise price of option 35 to option issuer 10. In step 310, option issuer 10 delivers exercise ratio assets to investor 20. In step 315, investor 20 delivers ABS note 25 to asset holder 15. In step 320, asset holder 15 delivers to investor 20 the stated principal amount of ABS note 25.

Figure 4:
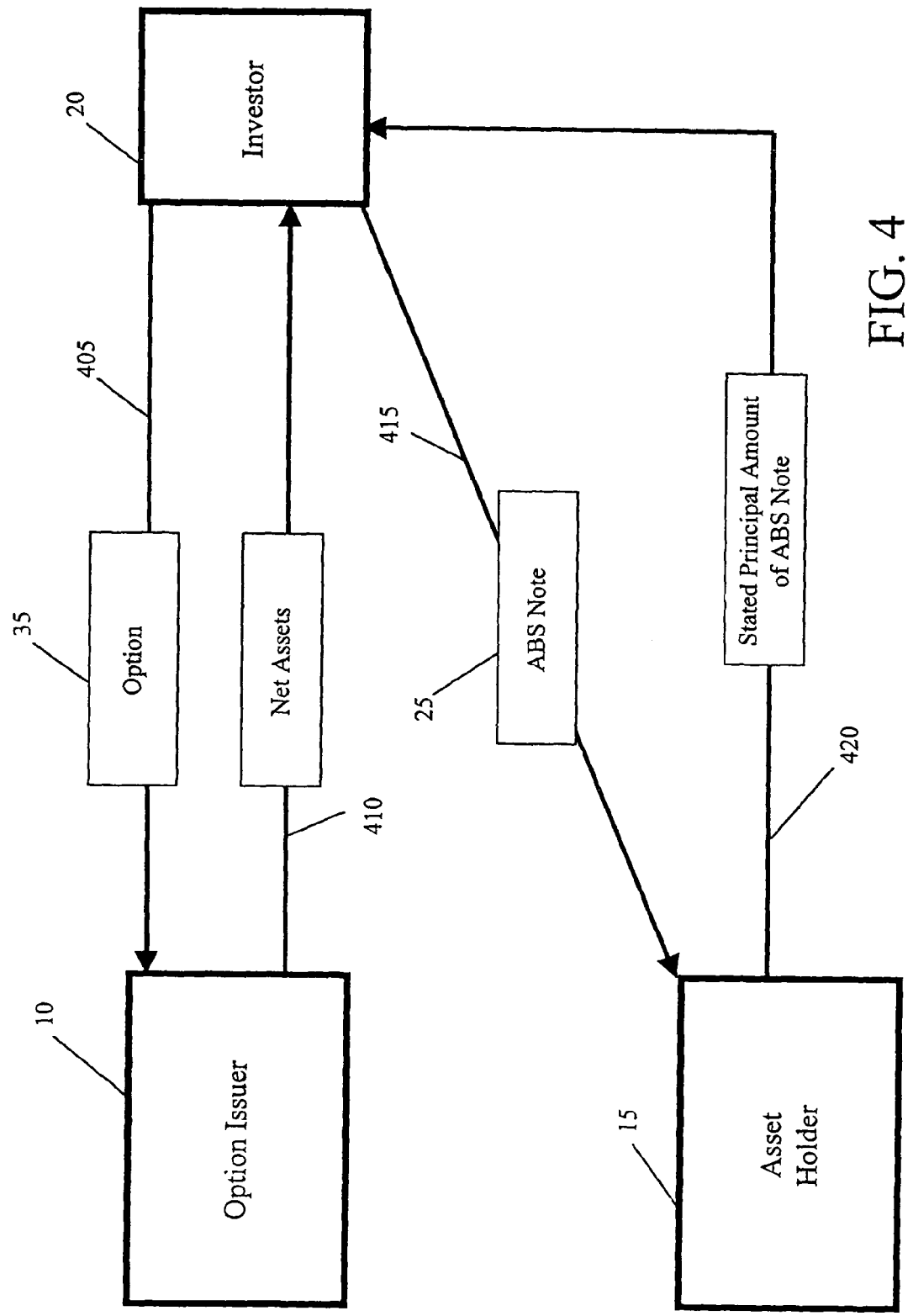
FIG. 4 is a cash flow schematic diagram of a net asset settlement at maturity of the financial unit security shown in FIG. 1, in a case of the financial unit security being "in-the-money".

FIG. 4 is a cash flow schematic diagram of a net asset settlement at maturity of ABC unit 30, in a case of ABC unit 30 being "in-the-money". That is, ABS note 25 has matured, and option 35 is in-the-money, and hence, option 35 has value. In "net asset settlement" the investor receives an amount of assets that is equal to the amount the exercise ratio assets exceed the strike price of the option. The investor does not pay cash to exercise his option.

In step 405, investor 20 delivers option 35 to option issuer 10. In step 410, option issuer 10 delivers the net assets to investor 20. In step 415, investor 20 delivers ABS note 25 to asset holder 15. ABS note 25 is retired. In step 420, asset holder 15 delivers the stated principal amount of ABS note 25 to investor 20.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. An system comprising:
memory operable to store at least one program; and
at least one processor communicatively coupled to the memory, in which the at least one program, when executed by the at least one processor, causes the at least one processor to:
access and process data regarding:
a secured debt security and an option coupled together as a financial unit security, said secured debt security being a security in which payment rights are secured by a pledge of specified assets of an issuer of said security, and a monetary value of said financial unit security, and
receive payment of said monetary value in exchange for said financial unit security.

2. The system of claim 1, wherein said secured debt security entitles a holder of said financial unit security to a payment that is secured by an asset of an issuer of said secured debt security.

3. The system of claim 1, wherein said secured debt security entitles a holder of said financial unit security to an interest payment.

4. The system of claim 1, wherein said option entitles a holder of said financial unit security to buy an asset at a specified price by a set time.

5. The system of claim 1, wherein said option comprises a warrant that entitles a holder of said financial unit security to purchase an equity interest of an issuer of said warrant.

6. The system of claim 1, wherein said value of said financial unit security is based on a factor selected from the group consisting of: (1) volatility of an asset that is a subject of said option; (2) yield for a comparable secured debt security; (3) interest rates in a debt market at a time of issuance of said financial unit security; (4) a stated maturity date of said financial unit security; (5) a price at which said option may be exercised; and (6) interest paid on said secured debt security.

7. A method comprising:
constructing a financial unit security by coupling a secured debt security to an option, said secured debt security being a security in which payment rights are secured by a pledge of specified assets of an issuer of said security;
determining with a computer a monetary value of said financial unit security; and
exchanging over a computer network in communication with said computer said financial unit security for a payment of said monetary value.

8. The method of claim 7, wherein said secured debt security entitles a holder of said financial unit security to an interest payment.

9. The method of claim 7, wherein said option entitles a holder of said financial unit security to buy an asset at a specified price by a set time.

10. The method of claim 7, wherein said option comprises a warrant that entitles a holder of said financial unit security to purchase an equity interest of an issuer of said warrant.

11. The method of claim 7, wherein said determining said value of said financial unit security comprises a calculation based on a factor selected from the group consisting of: (1) volatility of an asset that is a subject of said option; (2) yield for a comparable secured debt security; (3) interest rates in a debt market at a time of issuance of said financial unit security; (4) a stated maturity date of said financial unit security; (5) a price at which said option may be exercised; and (6) interest paid on said secured debt security.

* * * * *

UNITED STATES PATENT AND TRADEMARK OFFICE
CERTIFICATE OF CORRECTION

PATENT NO. : 8,630,928 B1
APPLICATION NO. : 10/750192
DATED : January 14, 2014
INVENTOR(S) : Sherman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2685 days.

Signed and Sealed this
Twelfth Day of January, 2016

Michelle K. Lee
*Director of the United States Patent and Trademark Office*